United States Patent [19]

Minor et al.

[11] Patent Number: 5,031,117

[45] Date of Patent: Jul. 9, 1991

[54] PRIORITIZATION SCHEME FOR ENHANCING THE DISPLAY OF RAY TRACED IMAGES

[75] Inventors: Barry L. Minor; Jeffrey A. Wilkinson; Eng-Shien Wu, all of Austin, Tex.

[73] Assignee: International Business Machines Corporation, Armonk, N.Y.

[21] Appl. No.: 480,189

[22] Filed: Feb. 13, 1990

[51] Int. Cl.[5] ............................................. G06F 15/72
[52] U.S. Cl. .................................. 364/521; 364/522; 340/728
[58] Field of Search ............... 340/701, 703, 704, 728, 340/729; 364/518, 521, 522

[56] References Cited

U.S. PATENT DOCUMENTS

| | | | |
|---|---|---|---|
| 4,627,004 | 12/1986 | Cool et al. | 364/521 |
| 4,631,690 | 12/1986 | Corthout et al. | 364/518 |
| 4,720,705 | 1/1988 | Gupta et al. | 340/724 |
| 4,805,127 | 2/1989 | Hata et al. | 364/521 |
| 4,825,391 | 4/1989 | Merz | 364/526 |
| 4,829,295 | 5/1989 | Hiroyuki | 340/728 |

FOREIGN PATENT DOCUMENTS 0319787 6/1989 European Pat. Off. .

OTHER PUBLICATIONS

"Antialiased Ray Tracing by Adaptive Progessive Refinement," by J. Painter and K. Sloan, Computer Graphics, vol. 23, No. 3, Jul. 1989.

"Reconstruction, Manipulation and Display of 3D Objects," by A. Musa and A. Kamel, IBM Kuwait Scientific Center, Nov. 1986.

Primary Examiner—David L. Clark
Attorney, Agent, or Firm—Mark E. McBurney

[57] ABSTRACT

A method and means are provided for utilizing, in a color imaging environment, such as ray tracing, display adapter hardware which is capable of interpolating color values for pixels lying in an area between previously color imaged pixels. A computer system CPU performs ray tracing calculations, or the like for a predetermined number of the total pixels, rather then each pixel, as is the case with conventional ray trace image systems. The system CPU then turns over the color imaged pixels to a display adapter, capable of color interpolating therebetween. Additionally, a prioritization scheme is provided which allows a graphics system user to assign priority values to particular areas or objects included in a scene description. In this way, the areas having higher priority values are subject to a greater concentration of ray tracing operations, thereby allowing these object to be displayed at a much faster rate. An even faster display of these prioritized areas can be achieved by combining the invocation of display adapter hardware to achieve color interpolation to the prioritization scheme.

24 Claims, 5 Drawing Sheets

PRIORITIZATION SCHEME FOR ENHANCING THE DISPLAY OF RAY TRACED IMAGES

CROSS REFERENCE TO RELATED APPLICATIONS

Co-pending U.S. Pat. application Ser. No. 07/480,190, filed Feb. 13, 1990 and assigned to the assignee of the present invention.

Co-pending U.S. Pat. application, entitled "Image Interpolator for an Image Display System," filed Oct. 31, 1988, having Ser. No. 07/264,922, and assigned to the assignee of the present invention.

BACKGROUND OF THE INVENTION

The present invention relates generally to the area of computer graphics and more particularly to methods and means for displaying of color images on display hardware. There are at least two distinct methods of placing color values (r.g.b) into the single picture elements (pixels) contained on a hardware screen: "rendering of geometry" and "displaying of image." "Rendering of geometry" is a method in which objects to be displayed on the screen are expressed as polygons. Vertices of these polygons have associated color values determined by calculations (lighting operations) performed at each rendering. Pixels, chosen at each rendering, are given these color values to display the vertices. Remaining pixels are given color values via "shading". "Shading" is the process of filling in the rest of the pixels that comprise a polygon during "rendering of geometry." Color values for these pixels are calculated from information known about the vertices of the polygon. "Gouraud shading" is one method of shading in which the color values of the vertices are color interpolated to derive the color values for the remaining pixels of the polygon. There are other methods of shading which do not involve color interpolation. In contrast to "rendering of geometry." pixels may be given color values by simply filling them in from an array of color values called an "image." In this case there are no established objects or polygons expressed to the display hardware. Such an image may have been obtained from a camera, or from a process of calculating color values such as "ray tracing." "Ray tracing" is a computation intensive method of calculating color values for a pixel. Typically, a computer system central processing unit (CPU) is utilized to perform these imaging computations. In these conventional systems the CPU performs all of the imaging (ray tracing) computations for each and every pixel on a display screen in sequential order. For a detailed discussion of ray tracing, see "An Overview of Ray Tracing," Andrew S. Glassner. It can be seen that imaging computations in general and ray tracing in particular are extremely time consuming and may take a matter of hours, or even days to complete this color imaging depending upon the description of the screen being displayed. The combination of calculating and displaying an image, may be called "color imaging."

Since ray tracing is an extremely computational intensive means of performing color imaging, it would be extremely desirable to have a prioritization scheme in place such that the pixels corresponding to the most important objects in a scene description are ray traced prior to other less significant objects. An antialiasing prioritization scheme has been discussed in "Antialiased Ray Tracing by Adaptive Progressive Refinement," by J.Painter and K.Sloan. This antialiasing prioritization method ray traces each pixel a number of times and then use sampling techniques to determine a priority regarding which pixels are to ray traced next. This prioritization is based upon the area lying between previously ray traced pixels and the in color therebetween. This article also discusses utilizing software to color interpolate non-ray traced pixels. It can be understood how a prioritization scheme which allows a user to modify the priority value of objects and areas in a particular screen description would be highly desirable.

Further, a number of currently available computer display adapter hardware devices are capable of performing rendering of geometry, including Gouraud shading. Gouraud shading is a graphics technique unrelated to color imaging, or ray tracing. Since Gouraud shading is implemented through color interpolation, these display adapters are capable of performing color interpolation. The present invention utilizes this color interpolation capability to achieve a goal not contemplated by the conventional and standard uses of Gouraud shading.

During the period when a CPU is performing the ray tracing calculation, all other associated computer graphics hardware remains idle awaiting completion of these computations. Therefore, it would be extremely desirable to provide a method which would optimize the efficiency of a computer graphic system by utilizing the capabilities of this idle graphics hardware in conjunction with the processing being conducted by the system CPU.

Additionally, it would be advantageous to have a graphics system with the capability of invoking this idle graphics display adapter hardware in conjunction with the previously discussed prioritization scheme.

SUMMARY OF THE INVENTION

In contrast to the prior art, the present invention allows a microprocessor included within an associated display adapter to be used to alleviate a portion of the computational burden imposed upon the system CPU during color imaging calculations. The present invention utilizes the color interpolation capability of associated display hardware to increase the speed of a computer graphics system performing color imaging.

Initially, the system CPU performs color imaging (e.g. ray tracing) on a predetermined plurality of pixels. At this point, the CPU then transmits the (r,g.b) values for each of these pixels to the processor of the display adapter hardware. The expression (i.e. communication between the CPU and display adapter) to the hardware, of these color values is in terms of a polygon to be Gouraud shaded even though "rendering of geometry" is not the method being used. Upon receipt of these pixel color values the display adapter processor then performs color interpolation for all of the pixels included within a geometric figure bounded by the color imaged pixels. Thus, it can be seen that the number of calculations required to be performed for a given screen description is vastly reduced. This reduction in calculations greatly improves the speed with which the scene can be color imaged.

Further, a prioritization scheme is utilized which subdivides areas of a display screen based upon a priority value assigned to objects in a scene description being displayed thereon. A graphics system user may assign priority values to specific objects and areas such that all ray tracing operations are concentrated on the highest priority items, thereby greatly increasing the speed at which these items are displayed.

An additional feature of the present invention allows for the display adapter hardware to be used in conjunction with the prioritization scheme, thus further increasing the display speed of the scene description.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Typically, a computer graphics user that wishes to perform lighting calculations will utilize a three-dimensional (3D) display adapter hardware device 16, such as a 2781 (High-Performance 3D Color Graphics Processor). sold by IBM. Included within the 3D lighting hardware is a portion which is dedicated to performing shading operations. Usually this shading hardware supports Gouraud shading, as discussed above, however other shading hardware utilizing color interpolation methods are contemplated by the scope of the present invention. During a normal lighting operation, the shading hardware is utilized as a hardware assist to aid the system CPU in achieving the desired lighting of a displayed image. The present invention utilizes this hardware assist capability during non-lighting calculations, in particular during color imaging such as ray tracing operations.

Figure 1:
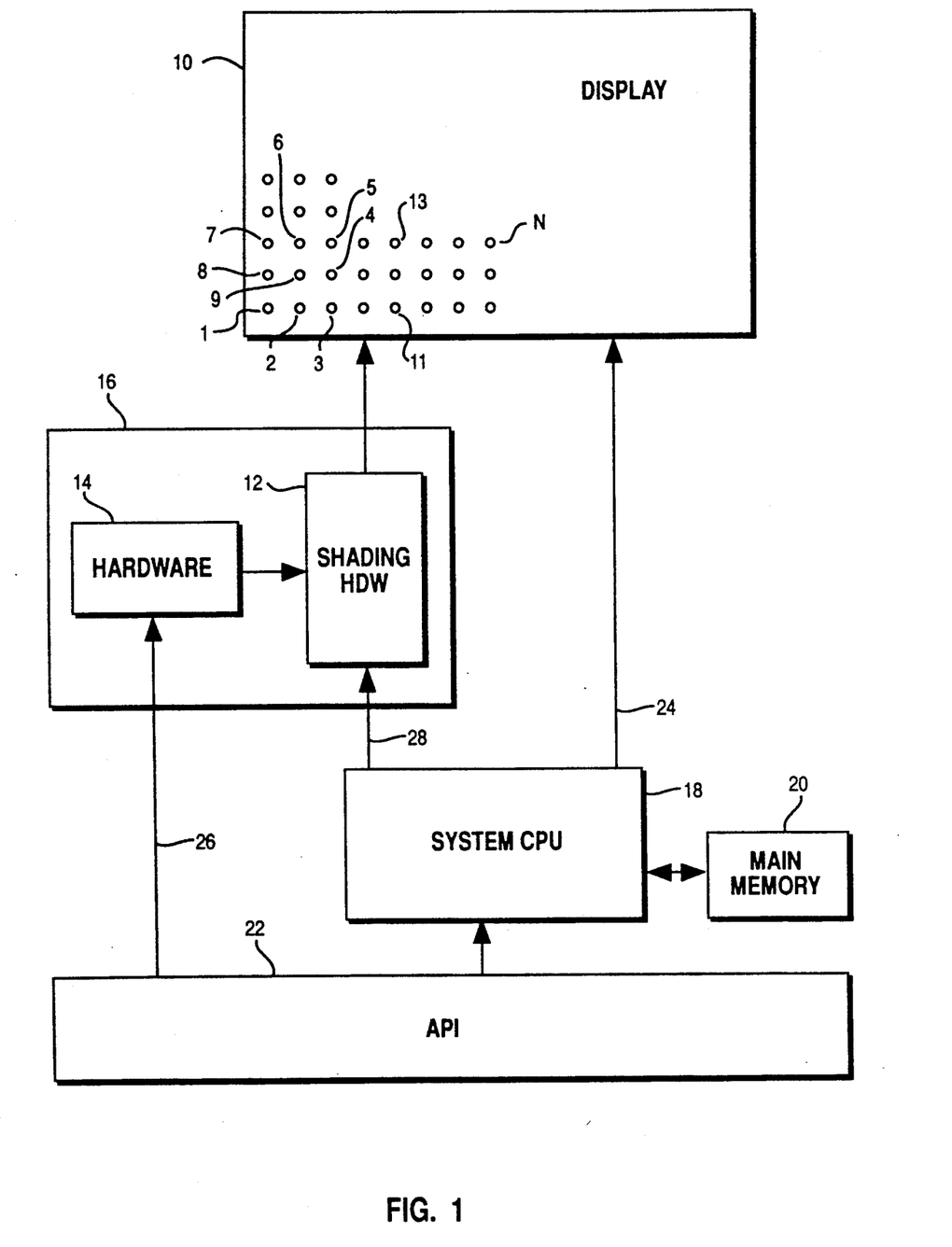
FIG. 1 is a block diagram depicting the elements utilized by the present invention.

Referring to FIG. 1, a block diagram of a system capable of utilizing the present invention is shown. A display 10, such as a CRT or the like is shown having a plurality of picture elements (pixels) which are depicted by reference numerals 1 2, 3 4 5, 6, 7, 8, 9, 11, 13 and N. A display adapter 16 typically used for performing rendering of geometry is illustrated and includes a shading processor 12 and all other associated hardware 14. This hardware may include buffers, such as a frame buffer, window buffer, Z-buffer or the like. A system CPU 18 is provided which performs all color imaging, such as ray tracing calculations. Also shown in FIG. 1 is the system main memory 20. It should be noted that the present invention is suited for use in all types of color imaging applications, however ray tracing is the primary method discussed herein.

Conventionally, an application program interface (API) 22, via bus 26, instructs the 3D lighting display adapter to perform rendering of geometry. This may include determining the location and consequences of a light source, as well as color interpolating a surface for shading purposes. It should be noted that in conventional systems no color imaging is performed by CPU 18 during rendering of geometry. Similarly, no rendering of geometry can be performed by prior art systems during the time color imaging computations are being implemented by CPU 18.

To perform color imaging in a ray tracing environment a scene description is first stored in main memory 20. This scene description is a textual or alphanumeric representation of the scene to be displayed. For example, a scene description will include geometric descriptions of all objects as well as their color (r.g.b) values and surface type. Additionally, the nature of each object, is included within the scene description, that is, whether the object is transparent, opaque, reflective or the like.

Upon implementation of a ray tracing operation, a program application user, via API 22 and bus 23, instructs the system CPU to perform a series of vector (ray) calculations for each pixel on display 10. System CPU 18 begins at pixel 1 and back traces a ray from a view point directly in front of that pixel, through the pixel in the image plane, and into the scene. For example if a ray 1 (corresponding to pixel 1) is found to initially intersect the surface of the ocean, then a lighting calculation is computed at the point of intersection between ray 1 and the surface and CPU 18 colors pixel 1 the computed shade. In this example, many floating point vector calculations are performed by CPU 18. Furthermore, if at pixel N the corresponding scene description is a convex reflective object, such as a mirrored sphere then the ray tracing calculation includes back tracing along a first ray from the view point through pixel N to the point of intersection with the reflective surface, calculating the angle of reflection to create a reflection ray which is then traced to find its nearest intersection with an object. These reflection rays are created and traced until an intersection is found with a non-reflective object at which point a shadow ray is created which is a ray from the point of intersection to the light source. If any intervening intersections are found along this ray. i.e. intersection with other objects, then the primary intersection point is found to be in a shadow and the lighting calculation, performed by the CPU 18 is adjusted accordingly. Upon completion of the lighting calculation at this point of intersection, pixel N is colored with the calculated shade. Thus, it can be seen how a number of reflective objects in the scene description can create an extremely time consuming and burdensome number of calculations to be performed by CPU 18. It is not uncommon for a period of hours or even days to elapse before a scene description is totally displayed on a CRT 10. This time lapse can cause an enormous burden on users of computer graphics systems. For example, a user of a computer graphics animation system may have to wait all day for the scene contemplated to be actually displayed such that it can be determined whether the scene description needs to be altered. It should be noted that display adapter 16 represents the previously described lighting hardware and processor 12, the shading hardware portion of display adapter 16.

Upon completion of the ray tracing computation, the CPU 18 then transmits, via bus 24, the calculated color for that pixel to the display 10. Again during the ray tracing calculation, display adapter 16, including shading processor 12 remains idle. In order to increase rendering speed, or more efficiently perform color imaging, the present invention, utilizes shading processor 12 to color a percentage of an images pixels through color interpolations of a subset of the ray traced pixels.

A number of display adapters such as the afore-mentioned 3D lighting hardware 16, are capable of filling (coloring) polygons onto display 10. Under typical color image operating conditions CPU 18 resolves individual pixels, as specified by a program application and then turns these pixels directly over to the CRT 10 for display. However, adapter 16, through shading processor 12, is capable of coloring polygons by interpolation methods, such as Gouraud shading, or the like. Generally, these polygons are simple polygons, such as squares, rectangles, triangles, and trapezoids. Therefore, the present invention exploits this capability of the display adapter hardware 16 to color interpolate simple polygons.

Specifically, a user of the computer graphics system of FIG. 1 determines the number (or percentage) of pixels to be color imaged, or ray traced, prior to the color interpolation being performed therebetween. For example, a user may desire that every other (one out of two) pixels be ray traced, such that pixels 1, 3, 5, and 7 are subjected to ray tracing calculations in sequential order. Upon completion of these four computations by CPU 18, their respective color values are passed to the shading processor 12, via bus 28, of display adapter 16. In this example pixels 1, 3, 5 and 7 are the boundaries of a square, which is a polygon the display adapter 16 is capable of filling. Thus the CPU 18 is now free to continue ray tracing for another portion of the scene description, such as that portion bounded by pixels 3. 5, 11 and 13. Meanwhile, shading processor 12 of display adapter 16 has interpolated the color of pixels 2, 4, 6, 8 and 9 from the known ray traced colors of pixels 1, 3, 5 and 7. Thus it is apparent how the present invention greatly increases the speed with which a ray traced image in a graphics system is rendered. That is, of pixels 1 through 9, shown in FIG. 1, only four pixels 1, 3, 5 and 7 are actually ray traced, whereas five pixels 2, 3, 6, 8 and 9 are colored by another processor. It should be noted that a user may choose the number and configuration of pixels to be ray traced. At one extreme, the four corner pixels of a display 10 may be ray traced with the remaining pixels of the screen being color interpolated. The other extreme may provide for ray tracing a high percentage of the total pixels, along the rows and columns of pixels on display 10 (see FIG. 3). By ray tracing one out of every 2 pixels, only 25 percent of the total pixels are eventually subject to ray tracing operations. Ray tracing every other pixel, as discussed above, has greatly increased rendering speed with an extremely minor deterioration in resolution. This minor deterioration in resolution is far outweighed by the increased rendering speed.

Figure 2:
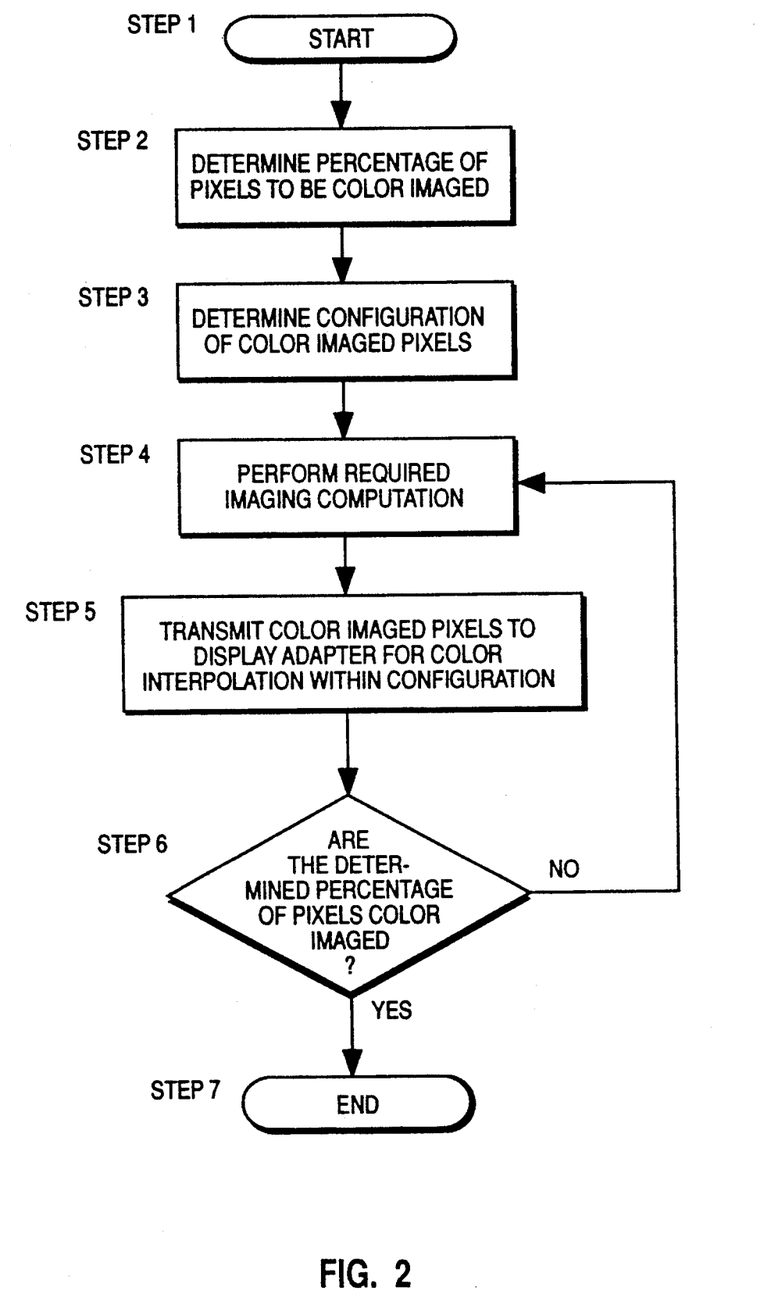
FIG. 2, is a flowchart showing the steps required by the present invention to implement the capabilities of the display adapter hardware.

FIG. 2 is a flowchart showing the steps required by the present invention to invoke and utilize the capability of the shading processor 12.

At step 1, the hardware utilization method is initiated by a user of a computer graphics system. Next the user, or perhaps an associated program application, will determine a percentage of pixels which are to be ray traced. This percentage may range from a minute portion of the total pixels, up to 100% in which case the entire screen (all pixels) will be ray traced and the present invention will not be used. As noted above, approximately 25% has been determined to give good resolution and a vastly increased rate of imaging. Step 3 determines the configuration of ray traced pixels which will be turned over to the display adapter 16 for filling. That is, the configuration of the ray traced pixels as a square, circle rectangle, trapezoid or other polygon will be determined thus allowing the display adapter to fill the area (pixels) lying between these polygonally configured ray traced pixels.

The actual ray tracing computations are then performed by CPU 18 of the computer graphics system (step 4). At step 5, the color values for these ray traced pixels and their configuration is then transmitted to the display adapter 16 from CPU 18 and via bus 28. Also at step 5, shading processor 12 fills (color interpolates) the pixels lying between these ray traced pixels and displays the ray traced and color interpolated pixels as a filled polygon, on display 10. Step 6 determines whether the percentage of pixels to be ray traced (determined at step 2) have actually been ray traced. If so, then the method of the present invention proceeds to step 7 and ends. However, if there are pixels remaining to be ray traced, then the method returns to step 4 where additional ray tracing is performed. Also, it should be noted that step 7 ends the process of the present invention, but the CPU 18 may continue ray tracing, and color image the previously color interpolated pixels.

Figure 3:
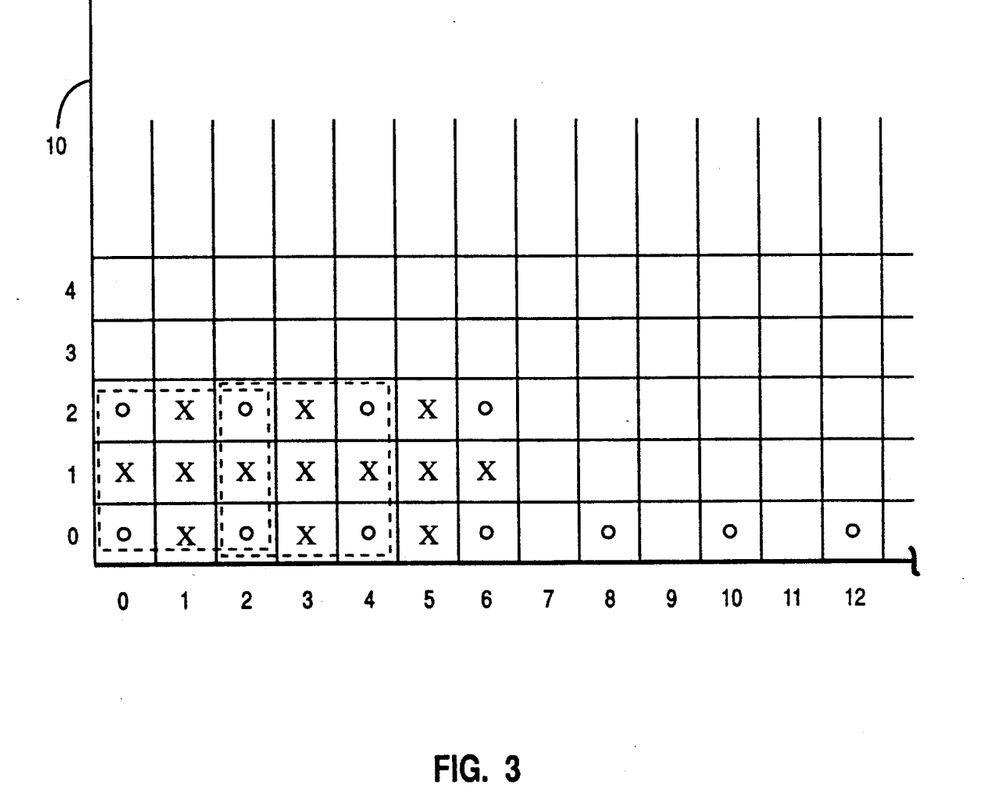
FIG. 3 is a diagram of a portion of a display showing those pixels which may be color interpolated and those being color imaged by a system utilizing the present invention.

FIG. 3 shows another configuration of pixels on display 10. It should be noted that dots represent color imaged pixels and X's represent color interpolated pixels. To invoke the configuration of FIG. 3. CPU 18 would color image every other pixel along the first line (row 0) of display 10. i.e. pixels 0, 2, 4, 6, 8, 10, 12 and so on. Next, CPU 18 will ray trace pixels 0,2 of row 2 such that a polygon (in this case a square) is bounded by pixels 0,2 of row 0 and pixels 0,2 of row 2. This polygon is then transmitted to shading processor 12 which color interpolates values for pixel 1 of row 0, pixels 0,1,2 of row 1 and pixel 1 of row 2. This block of pixels is then displayed on CRT 10.

Simultaneous to display of the first block of pixels. CPU 18 color images pixel of 4 row 2, which forms another square, since the remaining three bounding pixels have previously been ray traced. This second block is then color interpolated by shading processor 12 and values for pixel 3 of row 0, pixels 3.4 of row 1 and pixel 3 of row 2 are found. Therefore, it can be seen how by ray tracing one additional pixel, such as pixel 4 of row 2, four pixels may then be color interpolated. Further it can be seen how imaging pixel 6 of row 2 would allow another four pixels to be color interpolated and so forth. In this manner. i.e. using processor 12 as a hardware assist to color imaging, the thousands of pixels present on a typical CRT can be color imaged and color interpolated to display a complex scene which would otherwise take a matter of hours or even days to display.

Figure 4:
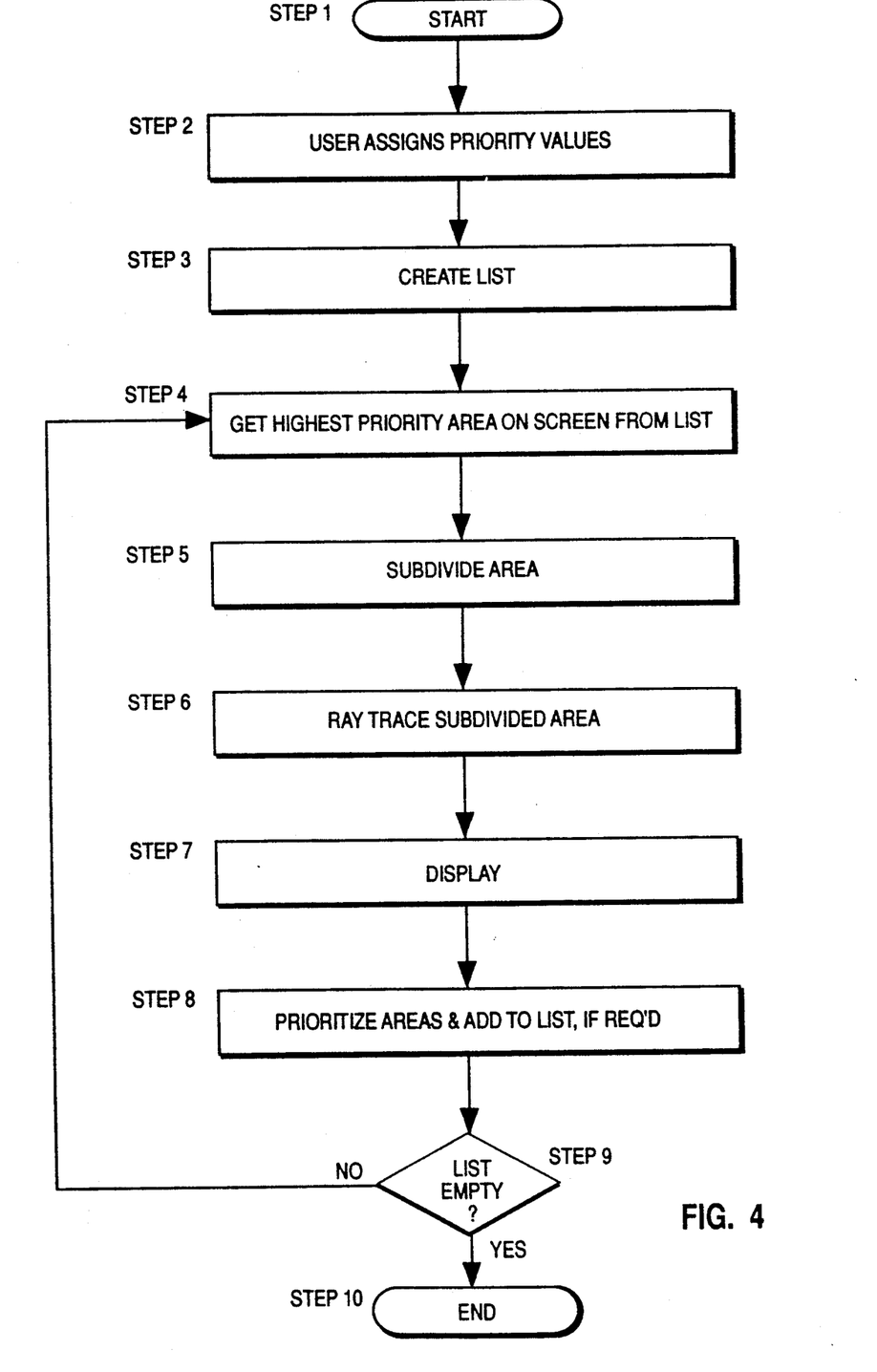
FIG. 4 is a flow chart depicting the steps required by the prioritization scheme of the present invention.
Figure 5:
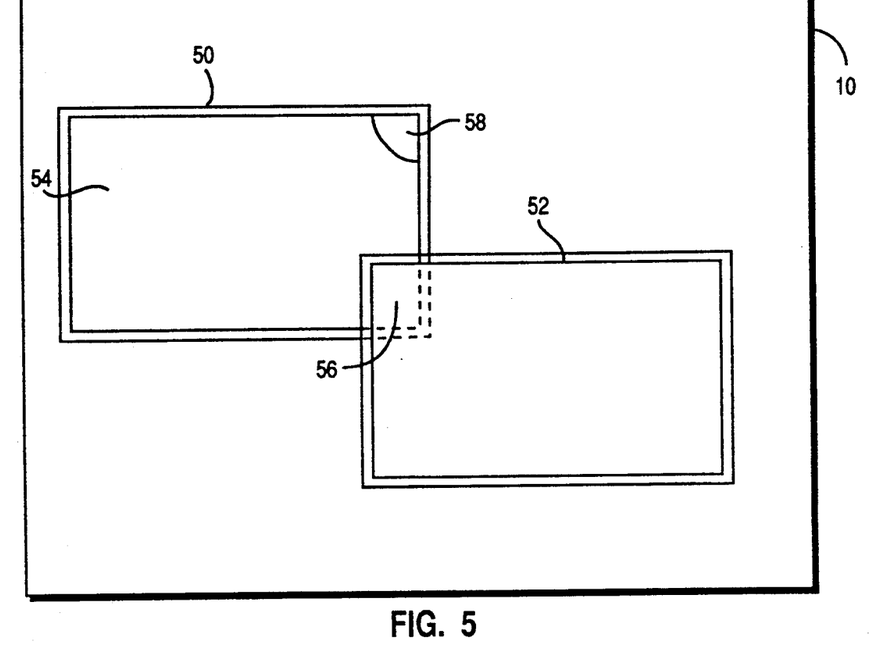
FIG. 5 is an illustration of a prioritized scene description of an embodiment of the present invention.
Figure 6:
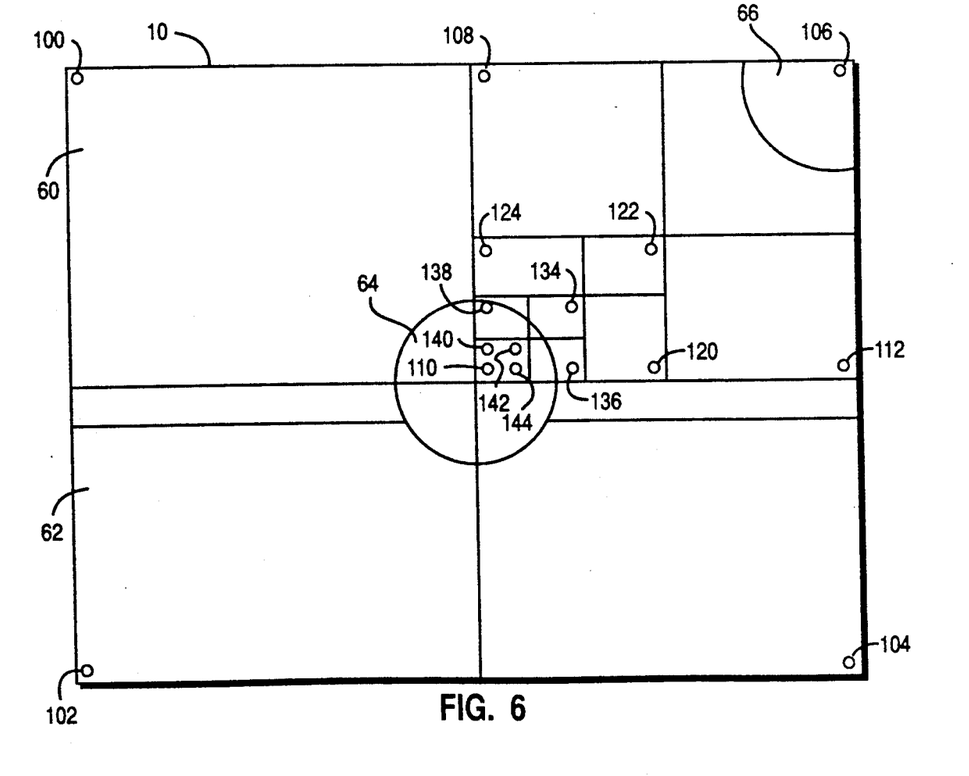
FIG. 6 is another illustration of a further embodiment of the present invention.

The present invention will now be described with reference to FIGS. 4. 5 and 6. The method by which the present invention prioritizes pixels to be ray traced will now be described in detail with reference to the flow chart of FIG. 4.

At step 1, the process starts and at step 2, a user initializes this priority scheme by assigning priority values to objects included within a particular scene. For example. FIG. 6 represents a scene description to be displayed upon a screen 10, wherein reference numerals 60 and 62 represent background objects and reference numerals 64 and 66 represent other objects. Thus, at step 2 a user assigns a priority value to each of these objects.

A list is then created at step 3 which is stored within a buffer, or other memory device capable of storing prioritized areas of the scene. Next at step 4, the system retrieves the highest priority area on the screen from the previously created list. This retrieved area is then subdivided at step 5. The screen 10 may be divided into any number of areas but initially the entire display screen 10 may be the only area included on the list. In that case, during the initialization of this process, the entire face of display screen 10 would be subdivided at step 5, resulting in a plurality of subdivided regions. This subdivision may occur by bisecting the area into rectangles or triangles, or by dividing the area into four similar regions or areas, as shown in FIG. 6. At step 6 the previously subdivided region is ray traced, with only the vertices of this divided area subject to ray tracing e.g. the 4 pixels at the vertices of a square will be ray traced at step 6. Step 7 then displays the subdivided region by color interpolating all pixels that have not been ray traced.

At step 8 the system of the present invention prioritizes the areas, or regions previously subdivided, ray traced and displayed. In this step, any region containing a pixel which has been color interpolated and which has an assigned priority value higher than other regions will receive more favorable status. That is, subsequent iterations of step 4 will cause the present invention to select the next region having the highest priority. Step 8 also adds the prioritized subdivided regions to the list previously created at step 3, if required. If all the pixels in a given area had been ray traced, then there would be no need to add that region to the list. It should be noted that step 8 also includes the step of sorting the prioritized subdivided regions such that the highest prioritized regions (those having the highest priority values), are always at the top of the list and subdivided prior to any lower priority subdivided areas, or regions. Step 8 also includes calculating a priority value for each subdivided region. This priority can be a heuristic function of several facts known about each region. One important factor is size i.e. larger regions will have a larger number of pixels for which no ray tracing has occurred, and may have a more urgent need to be subdivided. Another factor in determining priority is the change in color between the pixels which are ray traced to step 6. For example, if 4 pixels are ray traced in step 6, 2 of which are very different in color from the other 2, then an indication exists that a great change in color occurs between these pixels, requiring priority to be focused on this area due to the likelihood that the edge of an object exists within this area. Another factor is the personal priority that the user has assigned to objects encountered in the ray trace. That is, an animator or the like, may be focusing on a scene description in which a single object, or figure is the center of this particular description. Therefore, the user may wish to assign a very high priority to the object which is the center of the scene and lower priorities to the surrounding areas in order for the central object to be displayed at a more rapid rate. The nature of the object included in the scene description is also a factor to be a considered. For example, a reflective or multifaceted object may require a higher priority based upon the intricacies of this object and the amount of edges and different surfaces contained thereon.

It is then determined at step 9 whether the list is empty. i.e. are there areas remaining which contain pixels that have not been ray traced remaining. And if so, the prioritization scheme of the present invention proceeds to step 10 and ends, resulting in a scene which has been completely ray traced. However if at step 9 the list was not empty. i.e. there are areas of the scene containing pixels which have not been ray traced, then the process returns to step 4 which obtains the highest priority area from the list. Next, an example of the present invention will be described with reference to FIGS. 5 and 6 which depict various embodiments thereof. First, referring to FIG. 6, an exemplary scene is shown wherein the reference numerals 60 and 62, as well as 64 and 66, have been assigned priority values (step 2). In this case, assume reference numerals 60 and 62 correspond to priority values 15 and 10, respectively whereas reference numerals 64 and 66 correspond to priority values 50 and 25, respectively. Applying the prioritization scheme of the present invention, assume the list has been created (step 3). there is no highest priority on the list (step 4, since process is now being initialized) and the area has been initially divided into subdivided regions (step 5, again since this is the initialization of the process). Next, the subdivided region is ray traced, such that pixels designated by reference numerals 100, 102. 104 and 106 are ray traced. These pixels are then displayed (step 7) and the areas, or regions containing these pixels are prioritized and added to the list (step 8). In this case, pixel 106 is included in an area of object 66 having a priority value of 25, whereas pixel 100 is an area with the priority value of 15 and pixel 102 is in an area having a priority value of 10. Therefore the next subdivision of the display screen 10 will occur in the highest priority area, i.e. the area containing pixel 106. At this point the process determines whether the list is empty (which it is not) and then returns to step 4 and retrieves the highest priority subdivided region from the list (in this case the area containing pixel 106). Step 5 then subdivides the area into quadrants and ray traces this subdivided area (in this case pixels 108 110 and 112). These pixels are then displayed at step 7 (the non-ray traced pixels are also displayed by color interpolation) and step 8 again prioritizes this area. At this point in the example, pixel 106 is included in object 66 and has priority value of 25, pixel 108 has a priority value of 15 as does pixel 112. However, pixel 110 is included within an area of object 64 and therefore has a priority value of 50. This region containing pixel 110 is then given the highest priority and added to the list along with the other areas containing pixels 108, 106 and 112. Again, the area is subdivided, and the vertices are ray traced, in this example, pixels 124. 122 and 120 are ray traced and each have a priority value of 15, which is not greater than the priority value of object 64 which includes pixel 110. Therefore, after these areas are added to the list and sorted at step 8, the subdivided area is again subdivided and ray traced at pixels 138. 134 and 136. As this area is further subdivided, it can be seen that pixels 140, 142 and 144 are all contained within an object 64 having a priority value of 50. Therefore, this area will be the highest priority added to the list in step 8 and will continue to receive maximum priority with regard to the ray tracing of pixels contained in object 64 (due to the sorting of priority values occurring at step 4). It should be noted that after pixels 110, 112, 106 and 108 were originally ray traced the process would have proceeded to concentrate ray tracing on object 66 if its priority value had been higher than the priority value of object 64, and the same description previously discussed would apply equally as well under these circumstances. In that case, a decision would have been made by a user that object 66 is of more importance than object 64. It should also be noted that once ray tracing is complete for object 64 then the present invention will seek the next highest priority level and concentrate ray tracing in that area. Continuing with the previous example, once object 64 has been ray traced, its priority area is no longer added to the list at step 8. Therefore, the subdivided regions corresponding to the priority areas of object 66 (priority value 25) will be the highest priority areas contained on the list and the pixels contained therein will be subject to a greater concentration of ray tracing.

Another example of the present invention will be described with reference to FIG. 5. A display 10 including overlapping windows 50 and 52 is shown. In this case window 52 overlaps onto window 50 thereby obscuring a corner 56 of window 50. Since this corner 56 is obscured from view it can be assigned an extremely low priority value, thereby concentrating the system and method of the present invention onto the scene description of window 50 which is not obscured by window 52. In this case object 58 and background 54 would be assigned higher priority values than corner 56 and therefore be displayed at a much faster rate.

The previous example has been given for the case where each pixel contained on a display 10 is not displayed until it has been ray traced. In order to further increase the speed by which a scene description can be displayed, the prioritization method of FIG. 4 can be combined with the color interpolation method of FIG. 2 thereby greatly increasing performance. In the example previously discussed with reference to FIG. 6, pixels 100, 102, 104 and 106 can be ray traced by application of the process of FIG. 4 and then at step 7 of FIG. 4, the pixels lying therebetween (the remainder of the display screen) can be color interpolated as depicted by the process of FIG. 2. Further pixels 112, 106 and 108 are then ray traced and the remaining pixels lying therebetween (i.e. the upper right-hand quadrant) can be color interpolated. Consequently, it can be seen how the entire scene description can be displayed at a much faster rate by combining the prioritization scheme for ray tracing pixels with the color interpolation process which utilizes previously idle display adapter hardware to color pixels on display 10.

Although certain preferred embodiments have been shown and described it should be understood that many changes and modifications may be made therein without departing from the scope of the appended claims.

What is claimed is:

1. A method of displaying a scene onto a computer display screen, specific areas of said scene corresponding to specific pixels contained on said display screen, said method comprising the steps of:
   assigning priority values to the specific areas of said scene being displayed
   determining a number and location of pixels to be color imaged, said pixels encompassing a region of said display screen;
   performing color imaging calculations for said determined number of pixels;
   dividing said region of the display screen into subdivided regions; and
   prioritizing said subdivided regions based upon the occurrence of said color imaged pixels within said scene areas having the highest assigned priority value.

2. A method according to claim 1 wherein said method further comprises the step of:
   displaying said color imaged pixels on said display screen, after said step of performing color imaging calculations; and
   displaying all remaining pixels lying between said color imaged pixels, by color interpolation.

3. A method according to claim 2 wherein said method further comprises the steps of:
   storing said prioritized subdivided regions; and
   continuing said color imaging until all of said pixels have been displayed.

4. A method according to claim 3 wherein said step of storing comprises providing an orderable list capable of maintaining a plurality of said prioritized subdivided regions.

5. A method according to claim 4 further comprising the steps of:
   adding said prioritized subdivided regions to said list after the pixels contained therein have been displayed:
   sorting said prioritized subdivided regions contained within said list based upon the assigned priority value associated with the scene corresponding thereto:
   retrieving the subdivided region having the highest associated assigned priority value from said list;
   dividing said highest priority subdivided region further subdivided regions; and
   performing color imaging calculations for a predetermined number of pixels contained within said highest priority subdivided region.

6. A method according to claim 1 wherein said display screen includes a plurality of overlapping windows said step of assigning comprising the step of assigning a low priority value to the specific areas of said scene obscured by said overlapping window.

7. A method according to claim 1 further comprising the steps of:
   providing display hardware capable of performing color interpolation; and
   invoking said display hardware to perform color interpolation of said remaining pixels.

8. A method of displaying a scene onto a computer display, including a screen and adapter hardware capable of performing color interpolation, specific areas of said scene corresponding to specific pixels contained on said display screen, said method comprising the steps of:
   assigning priority values to the specific areas of said scene being displayed;
   determining a number and location of pixels to be color imaged said pixels encompassing a region of said display screen;
   performing color imaging calculations for said determined number of pixels;
   invoking said display adapter hardware to perform color interpolation on the remaining pixels contained within said region;
   dividing said region of the display screen into subdivided regions;
   prioritizing said subdivided regions based upon the occurrence of said color imaged pixels within said scene areas having the highest assigned priority value;

adding said prioritized subdivided regions to an orderable list after the pixels contained therein have been color imaged;

sorting said prioritized subdivided regions contained within said list based upon the assigned priority value associated with the scene corresponding thereto;

retrieving the prioritized subdivided region having the highest associated assigned priority value from said list; and concentrating said color imaging on pixels included within the highest priority subdivided regions.

9. A computer program for displaying a scene onto a computer display screen, specific areas of said scene corresponding to specific pixels contained on said display screen, comprising:

means for assigning priority values to the specific areas of said scene being displayed;

means for determining a number and location of pixels to be color imaged, said pixels encompassing a region of said display screen;

means for performing color imaging calculations for said determined number of pixels;

means for dividing said region of the display screen into subdivided regions; and means for prioritizing said subdivided regions based upon the occurrence of said color imaged pixels within said scene areas having the highest assigned priority value.

10. A computer program according to claim 9 further comprising:

means for displaying said color imaged pixels on said display screen; and means for color interpolating, and for displaying all remaining pixels that have not been color imaged.

11. A computer program according to claim 10 further comprising:

means for storing said prioritized subdivided regions; and means for continuing said color imaging until all of said pixels have been displayed.

12. A computer program according to claim 11 wherein said means for storing comprises an orderable list capable of maintaining a plurality of said prioritized subdivided regions.

13. A computer program according to claim 12 further comprising:

means for adding said prioritized subdivided regions to said list after the pixels contained therein have been displayed:

means for sorting said prioritized subdivided regions contained within said list based upon the assigned priority value associated with the scene corresponding thereto;

means for retrieving the subdivided region having the highest associated assigned priority value from said list;

means for dividing said highest priority subdivided region further subdivided regions; and means for performing color imaging calculations for a predetermined number of pixels contained within said highest priority subdivided region.

14. A computer program according to claim 9 wherein said display screen includes a plurality of overlapping windows and said means for assigning, assigns a low priority value to the specific areas of said scene obscured by said overlapping window.

15. A computer program according to claim 9 further comprising:

display hardware capable of performing color interpolation; and means for invoking said display hardware to color interpolate said remaining pixels.

16. A computer program for displaying a scene onto a computer display, including a screen and adapter hardware capable of performing color interpolation, specific areas of said scene corresponding to specific pixels contained on said display screen, comprising, means for assigning priority values to the specific areas of said scene being displayed;

means for determining a number and location of pixels to be color imaged, said pixels encompassing a region of said display screen;

means for performing color imaging calculations for said determined number of pixels;

means for invoking said display adapter hardware to perform color interpolation on the remaining pixels contained within said region;

means for dividing said region of the display screen into subdivided regions;

means for prioritizing said subdivided regions based upon the occurrence of said color imaged pixels within said scene areas having the highest assigned priority value;

means for adding said prioritized subdivided regions to an orderable list after the pixels contained therein have been color imaged;

means for sorting said prioritized subdivided regions contained within said list based upon the assigned priority value associated with the scene corresponding thereto;

means for retrieving the prioritized subdivided region having the highest associated assigned priority value from said list; and means for concentrating said color imaging on pixels included within the highest priority subdivided regions.

17. A system for displaying a scene onto a computer display screen, specific areas of said scene corresponding to specific pixels contained on said display screen, comprising:

means for assigning priority values to the specific areas of said scene being displayed;

means for determining a number and location of pixels to be color imaged said pixels encompassing a region of said display screen;

means for performing color imaging calculations for said determined number of pixels;

means for dividing said region of the display screen into subdivided regions; and means for prioritizing said subdivided regions based upon the occurrence of said color imaged pixels within said scene areas having the highest assigned priority value.

18. A system according to claim 17 further comprising:

means for displaying said color imaged pixels on said display screen; and means for color interpolating, and for displaying all remaining pixels that have not been color imaged.

19. A system according to claim 18 further comprising:

means for storing said prioritized subdivided regions; and means for continuing said color imaging until all of said pixels have been displayed.

20. A system according to claim 19 wherein said means for storing comprises an orderable list capable of maintaining a plurality of said prioritized subdivided regions.

21. A system according to claim 20 further comprising:
   means for adding said prioritized subdivided regions to said list after the pixels contained therein have been displayed;
   means for sorting said prioritized subdivided regions contained within said list based upon the assigned priority value associated with the scene corresponding thereto;
   means for retrieving the subdivided region having the highest associated assigned priority value from said list;
   means for dividing said highest priority subdivided region further subdivided regions; and
   means for performing color imaging calculations for a predetermined number of pixels contained within said highest priority subdivided region.

22. A system according to claim 17 wherein said display screen includes a plurality of overlapping windows and said means for assigning, assigns a low priority value to the specific areas of said scene obscured by said overlapping window.

23. A system according to claim 17 further comprising,
   display hardware capable of performing color interpolation; and
   means for invoking said display hardware to color interpolate said remaining pixels.

24. A system for displaying a scene onto a computer display, including a screen and adapter hardware capable of performing color interpolation specific areas of said scene corresponding to specific pixels contained on said display screen, comprising:
   means for assigning priority values to the specific areas of said scene being displayed;
   means for determining a number and location of pixels to be color imaged, said pixels encompassing a region of said display screen;
   means for performing color imaging calculations for said determined number of pixels;
   means for invoking said display adapter hardware to perform color interpolation on the remaining pixels contained within said region;
   means for dividing said region of the display screen into subdivided regions;
   means for prioritizing said subdivided regions based upon the occurrence of said color imaged pixels within said scene areas having the highest assigned priority value;
   means for adding said prioritized subdivided regions to an orderable list after the pixels contained therein have been color imaged;
   means for sorting said prioritized subdivided regions contained within said list based upon the assigned priority value associated with the scene corresponding thereto;
   means for retrieving the prioritized subdivided region having the highest associated assigned priority value from said list; and
   means for concentrating said color imaging on pixels included within the highest priority subdivided regions.

* * * * *